United States Patent
Shreve et al.

(10) Patent No.: US 11,983,171 B2
(45) Date of Patent: *May 14, 2024

(54) USING MULTIPLE TRAINED MODELS TO REDUCE DATA LABELING EFFORTS

(71) Applicant: Xerox Corporation, Norwalk, CT (US)

(72) Inventors: Matthew Shreve, Mountain View, CA (US); Francisco E. Torres, San Jose, CA (US); Raja Bala, Pittsford, NY (US); Robert R. Price, Palo Alto, CA (US); Pei Li, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,333

(22) Filed: Jul. 7, 2023

(65) Prior Publication Data
US 2023/0350880 A1 Nov. 2, 2023

Related U.S. Application Data

(63) Continuation of application No. 17/221,661, filed on Apr. 2, 2021, now Pat. No. 11,714,802.

(51) Int. Cl.
*G06F 16/00* (2019.01)
*G06F 16/23* (2019.01)
*G06N 20/00* (2019.01)

(52) U.S. Cl.
CPC ......... *G06F 16/2379* (2019.01); *G06N 20/00* (2019.01)

(58) Field of Classification Search
CPC ............. G06F 16/2379; G06F 18/2155; G06F 18/2178; G06F 18/23213; G06F 18/41; G06N 20/00; G06N 3/045; G06N 5/02
See application file for complete search history.

(56) References Cited

U.S. PATENT DOCUMENTS

| | | | | |
|---|---|---|---|---|
| 10,430,690 B1 * | 10/2019 | Chen | ................... | G06F 18/2415 |
| 11,048,979 B1 * | 6/2021 | Zhdanov | ............. | G06F 18/2155 |
| 11,288,513 B1 * | 3/2022 | Desai | ..................... | G06F 3/167 |
| 11,321,629 B1 * | 5/2022 | Rowan | ................... | G06N 20/00 |
| 11,416,754 B1 * | 8/2022 | Durvasula | ................ | G06N 3/08 |

(Continued)

OTHER PUBLICATIONS

The Extended European Search Report for Application No. EP 22163100.5 dated Aug. 8, 2022, 11 pages.

*Primary Examiner* — Noosha Arjomandi
(74) *Attorney, Agent, or Firm* — Womble Bond Dickinson (US) LLP (57) ABSTRACT

A method of labeling a dataset includes inputting a testing set comprising a plurality of input data samples into a plurality of pre-trained machine learning models to generate a set of embeddings output by the plurality of pre-trained machine learning models. The method further includes performing an iterative cluster labeling algorithm that includes generating a plurality of clusterings from the set of embeddings, analyzing the plurality of clusterings to identify a target embedding with a highest cluster quality, analyzing the target embedding to determine a compactness for each of the plurality of clusterings of the target embedding, and identifying a target cluster among the plurality of clusterings of the target embedding based on the compactness. The method further includes assigning pseudo-labels to the subset of the plurality of input data samples that are members of the target cluster.

20 Claims, 7 Drawing Sheets

(56) References Cited

U.S. PATENT DOCUMENTS

| | | |
|---|---|---|
| 11,714,802 B2* | 8/2023 | Shreve ............... G06F 16/2379 |
| | | 707/703 |
| 11,741,168 B1* | 8/2023 | Bodapati ................ G06F 16/35 |
| | | 706/12 |
| 2017/0116544 A1* | 4/2017 | Johnson ................. G06N 20/10 |
| 2018/0114098 A1 | 4/2018 | Desai et al. |
| 2018/0240031 A1 | 8/2018 | Huszar et al. |
| 2019/0073447 A1* | 3/2019 | Guo ................... G06V 10/7784 |
| 2019/0122378 A1* | 4/2019 | Aswin ....................... G06T 7/20 |
| 2019/0236412 A1* | 8/2019 | Zhao ................. G06F 18/2148 |
| 2019/0266487 A1* | 8/2019 | Chollet .................. G06V 20/00 |
| 2020/0134391 A1* | 4/2020 | Assaderaghi .......... G06V 10/82 |
| 2020/0382527 A1* | 12/2020 | Mitelman .............. G06N 20/20 |
| 2021/0081822 A1* | 3/2021 | Davidson ........... G06V 10/7715 |
| 2021/0125732 A1* | 4/2021 | Patel ........................ G06N 5/01 |
| 2021/0182606 A1* | 6/2021 | Maroo ................. G06F 18/214 |
| 2021/0241153 A1* | 8/2021 | Branchaud-Charron .................... |
| | | G06N 20/00 |
| 2021/0264300 A1* | 8/2021 | Staudinger ........... G06V 10/762 |
| 2022/0058440 A1* | 2/2022 | Feng ................. G06F 18/2178 |
| 2022/0076074 A1* | 3/2022 | Li .......................... G06V 10/82 |
| 2022/0084510 A1* | 3/2022 | Peng .................... G10L 15/063 |
| 2022/0114490 A1* | 4/2022 | Das ........................ G06N 20/00 |
| 2022/0156519 A1* | 5/2022 | Ghorbani ................ G06F 17/18 |
| 2022/0210079 A1* | 6/2022 | Koren ..................... G06F 18/24 |
| 2022/0262104 A1* | 8/2022 | Salman ................. G06V 10/82 |
| 2022/0318229 A1* | 10/2022 | Shreve .................. G06N 3/045 |
| 2022/0318669 A1* | 10/2022 | Alexander ........... G06N 3/0455 |
| 2022/0335258 A1* | 10/2022 | Raventos ............ G06F 18/2148 |
| 2022/0382527 A1 | 12/2022 | Wang et al. |

* cited by examiner

| Embedding | Group1 | | Group2 | |
| --- | --- | --- | --- | --- |
| | K-means | DBSCAN | Test Acc. (20) | DBSCAN | Test Acc. (20) |
| 1 | 0.38 | 0.43 | 0.78 | 0.464 | 0.74 |
| 2 | 0.319 | 0.446 | 0.835 | 0.433 | 0.84 |
| 3 | 0.364 | 0.447 | 0.776 | 0.452 | 0.756 |
| 4 | 0.352 | 0.425 | 0.82 | 0.437 | 0.83 |
| 5 | 0.376 | 0.455 | 0.799 | 0.445 | 0.798 |
| Cross-embedding | 0.39 | 0.504 | | 0.742 | |

USING MULTIPLE TRAINED MODELS TO REDUCE DATA LABELING EFFORTS

CROSS-REFERENCE TO RELATED APPLICATION

This application is a continuation of U.S. patent application Ser. No. 17/221,661, filed Apr. 2, 2021, entitled "USING MULTIPLE TRAINED MODELS TO REDUCE DATA LABELING EFFORTS", which is hereby incorporated by reference.

TECHNICAL FIELD

Implementations of the present disclosure relate to deep learning, and more particularly to using multiple trained models to reduce data labeling efforts.

BACKGROUND

Machine learning is an application of artificial intelligence (AI) that provides systems the ability to automatically learn and improve from experience without being explicitly programmed. Machine learning focuses on the development of computer programs that can access data and use it to learn for themselves. The process of learning begins with observations or data, such as examples, direct experience, or instruction, in order to look for patterns in data and make better decisions in the future based on provided examples. The primary aim is to allow the computers to learn automatically without human intervention or assistance and adjust actions accordingly.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Methods and systems related to using multiple trained models (e.g., deep learning models) to reduce data labeling efforts are described herein. In one embodiment, as deep learning has achieved widespread success over the last decade, one benefit is that hundreds if not thousands of fully trained models have been collected and made available to the public. However, as expected, there are still a large numbers of tasks for which no models exist, therefore requiring new models to be trained.

In one embodiment, one of the most significant limiting factors for training a new model from scratch may be the availability of labeled training data in sufficient quantity and diversity to achieve accurate and efficient results. For example, in the case of computer vision tasks, labeled training data may include images or video along with labels containing some ground truth, which may be desirable to be able to automatically predict from the images.

In some scenarios, both image acquisition and labeling are costly and time consuming. In other scenarios, even if images are available in a sufficient amount, manual labeling at large scale may be time, cost, and/or resource prohibitive.

Numerous machine learning approaches that can reduce the label requirements for training new models while retaining the performance achieved using all of the available labeled data are contemplated. In a variety of embodiments, the label reductions achieved by these methods may be minor (e.g., 10-fold reduction) and rely on a single model and related domain. One of the most limiting factors of such embodiments is that these methods may not build a global view that contains multiple, diverse perspectives of the unlabeled data, but rather focuses on making adjustments and changes to a single model (i.e., fine-tuning) that embeds a single perspective of the unlabeled data.

The present disclosure overcomes the above problems, and others, by describing methods and systems related to using multiple trained models to reduce data labeling efforts, which allows large datasets of unlabeled data to be provided labels using only a small number of human-labeled examples.

Advantageously, the methods and systems described herein analyze a collection of pre-trained models that are related to the task at hand, using a collection of graph-based measures to effectively organize large volumes of unlabeled data into groups/clusters with a high probability of belonging to the same class. Human effort is reduced to providing only a label for each identified cluster, for example by providing a label for one image per identified cluster, therefore enabling the automatic annotation of large datasets with only a fraction of the samples manually labeled. It may be useful for the labels of the clusters to be human-readable for human interpretation in subsequent uses of the newly labeled dataset, but in some cases, like when using the data to train a classifier, human-readable labels may not be needed.

In one embodiment, visual classification tasks are used merely as a non-limiting example, wherein the labels correspond to semantic categories to which the image (or objects within the image) belong.

Figure 1:
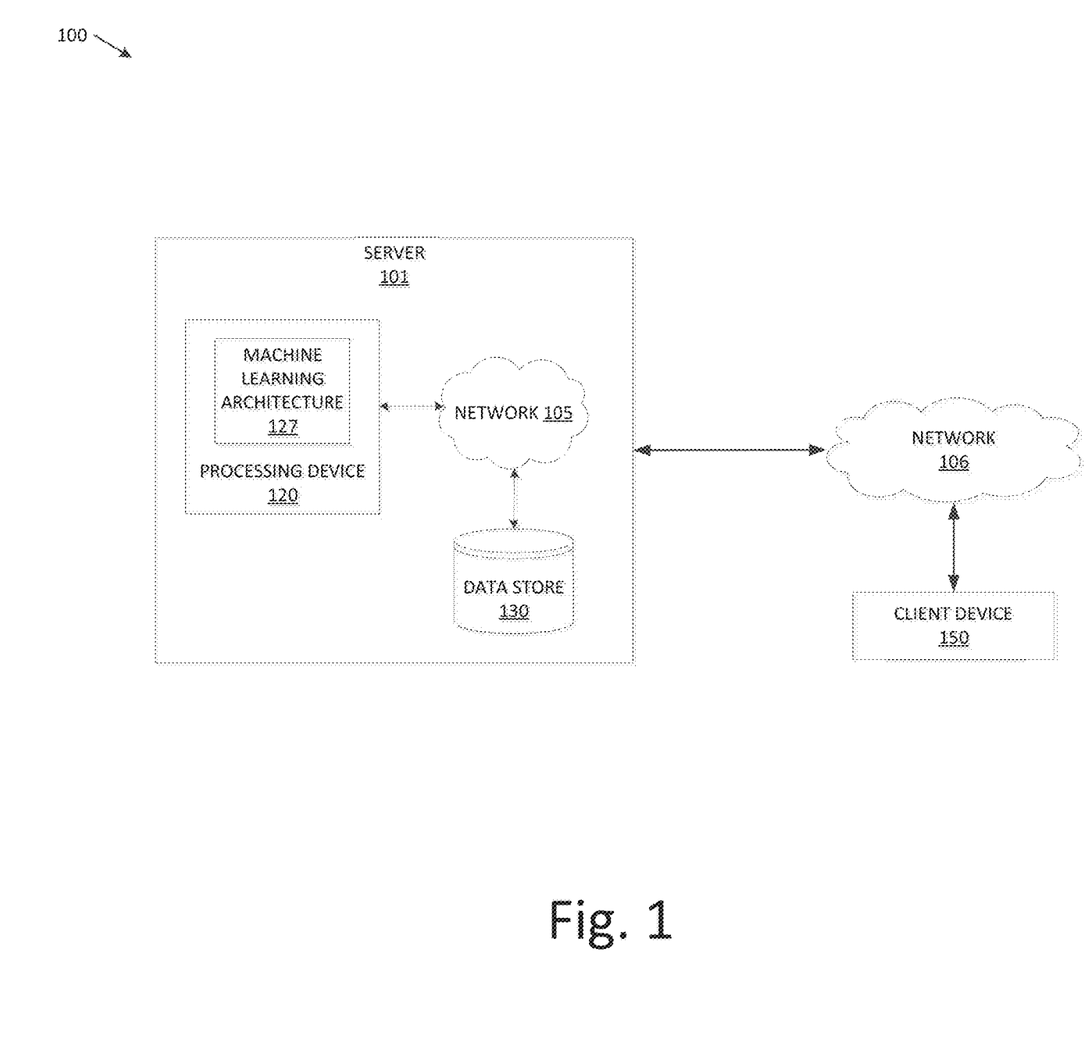
FIG. 1 is a diagram showing a machine learning system for use with implementations of the present disclosure.

FIG. 1 is a diagram showing a machine learning system 100 for use with implementations of the present disclosure. Although specific components are disclosed in machine learning system 100, it should be appreciated that such components are examples. That is, embodiments of the present invention are well suited to having various other components or variations of the components recited in machine learning system 100. It is appreciated that the components in machine learning system 100 may operate with other components than those presented, and that not all of the components of machine learning system 100 may be required to achieve the goals of machine learning system 100.

In one embodiment, system 100 includes server 101, network 106, and client device 150. Server 100 may include various components, which may allow for using multiple trained models to reduce data labeling efforts on a server device or client device. Each component may perform different functions, operations, actions, processes, methods, etc., for a web application and/or may provide different services, functionalities, and/or resources for the web application. Server 100 may include machine learning architecture 127 of processing device 120 to perform operations related to using multiple trained models to reduce data labeling efforts. In one embodiment, processing device 120 comprises one or more graphics processing units of one or more servers (e.g., including server 101). Additional details of machine learning architecture 127 are provided with respect to FIGS. 2-7. Server 101 may further include network 105 and data store 130.

The processing device 120 and the data store 130 are operatively coupled to each other (e.g., may be operatively coupled, communicatively coupled, may communicate data/ messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The server 100 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/ corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

As discussed herein, the server 101 may provide machine learning functionality to a client device (e.g., client device 150). In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 100. Further implementation details of the operations performed by system 101 are described with respect to FIGS. 2-6.

Figure 2:
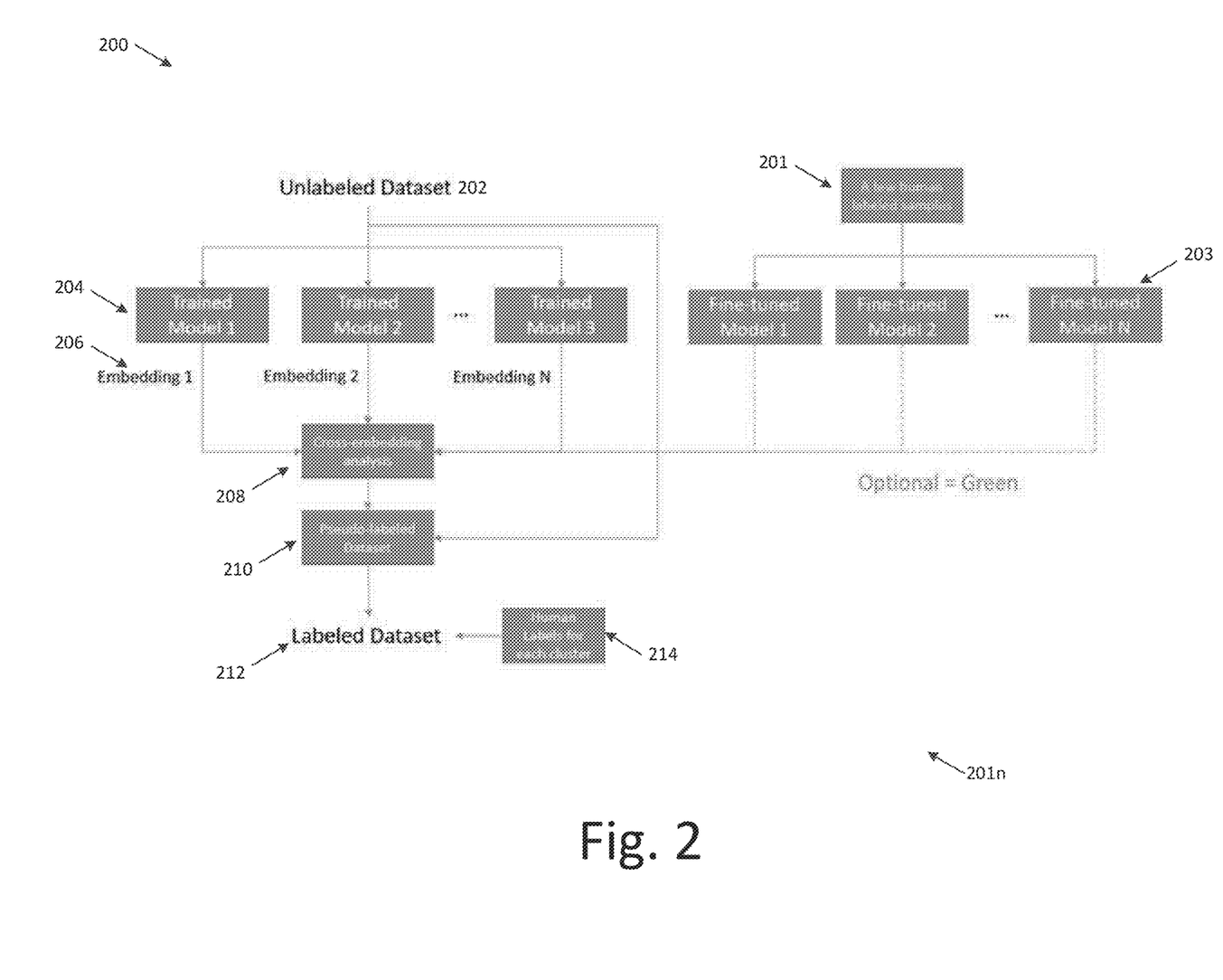
FIG. 2 is a graphical diagram showing a first method of using multiple trained models to reduce data labeling efforts, in accordance with some embodiments.

FIG. 2 is a graphical diagram showing a first method of using multiple trained models to reduce data labeling efforts, in accordance with some embodiments. For example, the processes described with reference to FIG. 2 may be performed by processing logic of machine learning architecture 127 as described with reference to FIG. 1.

In one embodiment, an unlabeled dataset 202 is passed through a collection of trained models 204 and a wide-variety of embeddings 206 are extracted from various layer depths across all models. Next, a cross-embedding analysis module 208 may be used to identify structures, patterns, and other characteristics within and across each embedding that can be used to identify that different samples from the unlabeled dataset belong to the same unknown class. By the end of this module 208, one or more samples will be provided a pseudo-label indicating a generic class label. In order to turn the pseudo-labeled dataset 210 into a labeled dataset 212, one sample from each generic class label may be provided a human label 214 and, in turn, the labels of the members of the same generic class may then be updated. In one embodiment, the selection of each sample may be based on the distance metric-based clustering, or based on topological measures including Eigen-centrality, h-index, etc.

In one embodiment, method 200 may include one or more additional optional features, in addition to those already described. For example, in some cases, users of this approach may be willing to hand label 201 a few examples ahead of time (e.g., twenty images from each class) to potentially achieve better accuracy in the automated labeling performance. In one embodiment, the selection criteria of these samples that are then labeled may include those based on graph or topological measures, randomly selected points, previous iterations of the proposed approach, etc.

Next, one or more models 203 (which may be the same as, or different from, the models 204) may be trained or fine-tuned with these hand labeled samples with the expectation that the embeddings extracted from these updated models will achieve better performance in the cross-embedding analysis, therefore better accuracy in the pseudo-labeled and labeled dataset.

Figure 3:
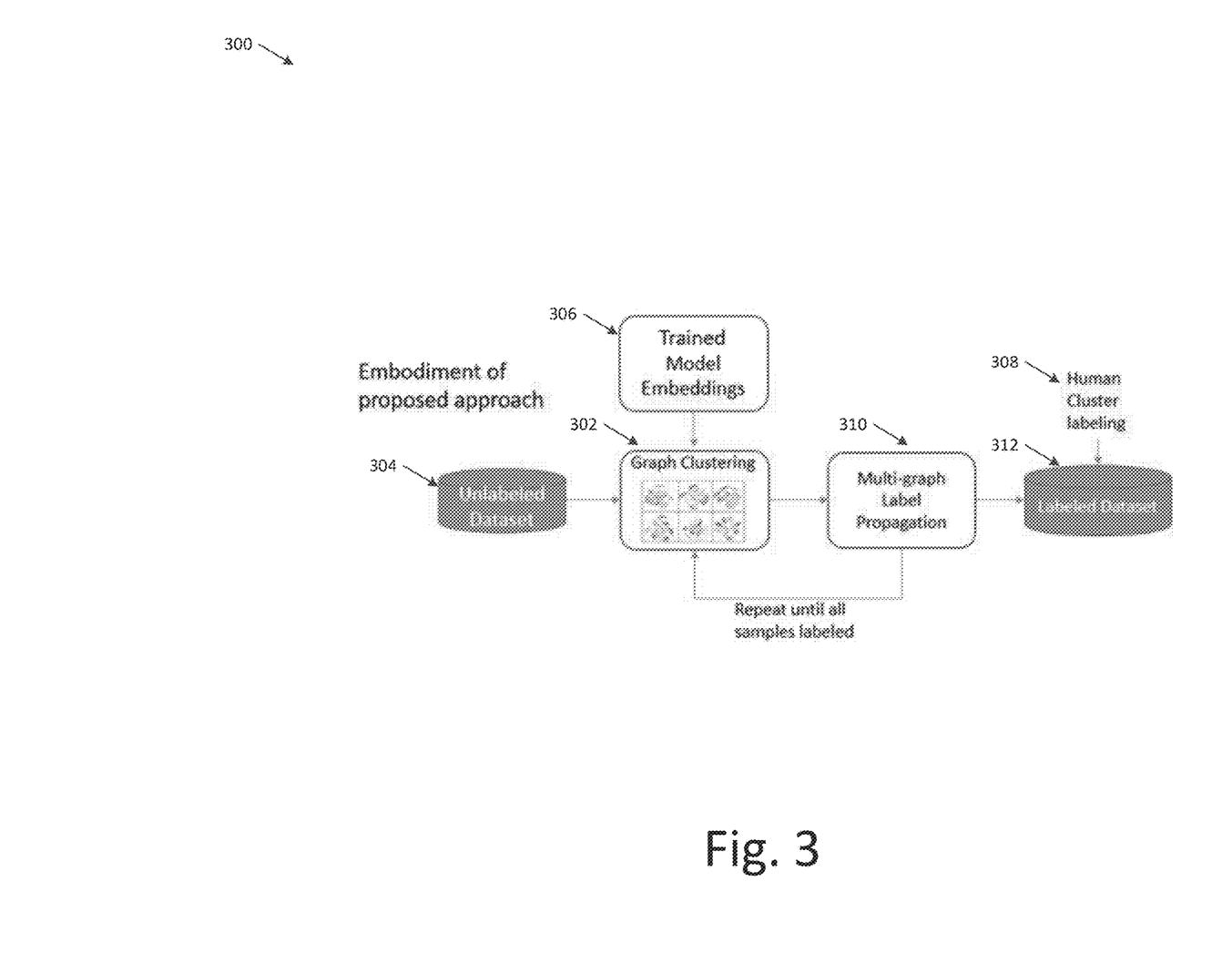
FIG. 3 is a graphical diagram showing a second method of using multiple trained models to reduce data labeling efforts, in accordance with some embodiments.

FIG. 3 is a graphical diagram showing a second method 300 of using multiple trained models to reduce data labeling efforts, in accordance with some embodiments. For example, the processes described with reference to FIG. 3 may be performed by processing logic of machine learning architecture 127 as described with reference to FIG. 1.

Referring to FIG. 3, a set of graphs (e.g., having nodes and edges) 302 is constructed for an unlabeled data set 304 using multiple constructors (Euclidean distance, dot product similarity, etc.) for pairs of embeddings 206. Next, hand-engineered measures 308 may be used to detect communities of samples (overlapping groups of samples) across multiple embeddings 310, resulting in a labeled dataset 312.

In one embodiment, embeddings 306 are lower dimensional representations of high dimensional input data. They are typically learned by models that are trained to perform some task (e.g., detect objects, recognize faces, categorize sentiment in text, etc.). Advantageously, the feature embeddings learned by a collection of deep-network models trained for some previously specified tasks can be collectively analyzed, and the resulting structure can be used to reduce the labeling efforts of new training data for some new task, as long as the tasks learned by the trained models are related. As mentioned previously, there are numerous trained models suitable for use here, so one challenge is how to select related models so that they can be appropriately used for labeling efforts.

In one embodiment, many trained models may include supplemental metadata. This metadata often defines the modality (e.g., sentences, images, videos) and objective (e.g., classification, localization, machine translation), datasets used to train them, etc. Therefore, models relevant to the task at hand can be found using similar class or dataset name matches. Alternatively, or in addition, one can leverage any number of suitable model similarity measures contemplated. Features extracted from multiple layers of a network may be analyzed for their contribution to categories of high-level concepts. For example, the feature embeddings extracted from earlier layers may be better suited to predict the presence or non-presence of wrinkles in faces, while deeper layers may better distinguish facial expressions or identity. Methods for measuring contribution includes manually calculating how many images have been correctly classified using models that are trained on each set of features. One motivation for such is to discover the extent of how groups of different filters encode various concepts. Therefore, contribution of each filter to a concept could be used to measure the similarities and differences between models trained on different tasks.

In another embodiment, model ontologies may be constructed based on related tasks that are found to be suitable for transfer learning. For example, task-dependent structures that learned to calculate optical flow may be found to be relevant for computing stereo reconstruction maps. Similarly, models trained for edge detection may be found to be good for finding point correspondences. In yet another variant, the present unlabeled data can be compared with data that was used to generate a pre-trained model (if such data is available) in embedding space. A high degree of overlap between the two datasets suggests that the given model is likely to generate embeddings relevant to the task at hand. In one embodiment, metrics such as Hausdorff distance can be used to assess similarity of a pair of data sets in the embedding space.

In one embodiment, once a collection of deep models is selected, for each model one may precisely define the embedding(s) that will serve as the model's projection of the input images into a low-dimensional space in our invention. In general, higher level semantics (e.g., faces, vehicles, cats, etc.) can be found in deeper layers of a network, while more primitive filters (e.g., corners, edges, etc.) are found in the early layers. Intermediate layers can also contain valuable structures (e.g., wheels, doors, windows, etc.) that can be applied to various tasks. In the current approach, a wide-variety of embeddings extracted from various layer depths across all models may be selected.

In more sophisticated approaches, a statistical likelihood for the suitability of each network layer/embedding in a network for target task may be determined and utilized. For example, it is likely that the early layers in a network trained to detect faces may also be more useful for facial expression detection and age classification than intermediate or later layers in a network. Similarly, intermediate or deeper layers in an animal classification network may be more useful for detecting different types of cats, since the filter responses at deeper layers may be more adaptable to pick up on the structural, within-class variance of different cat types. Interpretability models such as Grad-cam may be leveraged for this purpose.

One approach for graph clustering is shown in Algorithm 1 below. In one embodiment, after a collection of related deep models is established, the unlabeled dataset may be fed through each model and the feature embeddings extracted at various depths of each network.

---

Algorithm 1 Iteratively clustering, labeling and filtering.

---

Target dataset :TD;
Selected models (embeddings) :SE;
Initialize class numbers :N;
while N !=0 do
    For data in TD, Extract features from SE;
    Clustering (K-means and DBSCAN);
    Calculate the Davies Bouldin score or Silhouette Score :Score;
    select the embedding with the best Score;
    Calculate the compactness of each cluster :Compa;
    Pick the cluster with largest Compa : MaxC, and assign a pseudo label to all the points within this cluster:
    Remove the points in MaxC from all embeddings in SE :
    Decrease N :
end while

---

Next, a clustering algorithm (e.g. K-means, DBSCAN) may be performed on the extracted features, assigning each feature point to one of N clusters. In the graph clustering block in FIG. 3, several feature embeddings that have been clustered are shown. The next step may be to analyze each of these clusters to determine those that are likely to comprise samples that belong to the same class. To accomplish this, the embedding that has the best clustering quality as measured by e.g. DB score or Silhouette score may be selected. The score may be used to identify which embedding, on a global scale, has the best set of clusters. Next, for this embedding, the compactness of each cluster may be calculated. The samples/points within the cluster with largest compactness are then assigned a unique pseudo-label and removed from the testing set in all embeddings. When a new iteration starts, N may be decremented by one, and the clustering algorithm may be performed on the rest of the testing data. This procedure may be repeated until all data points are assigned pseudo labels.

Figure 4:
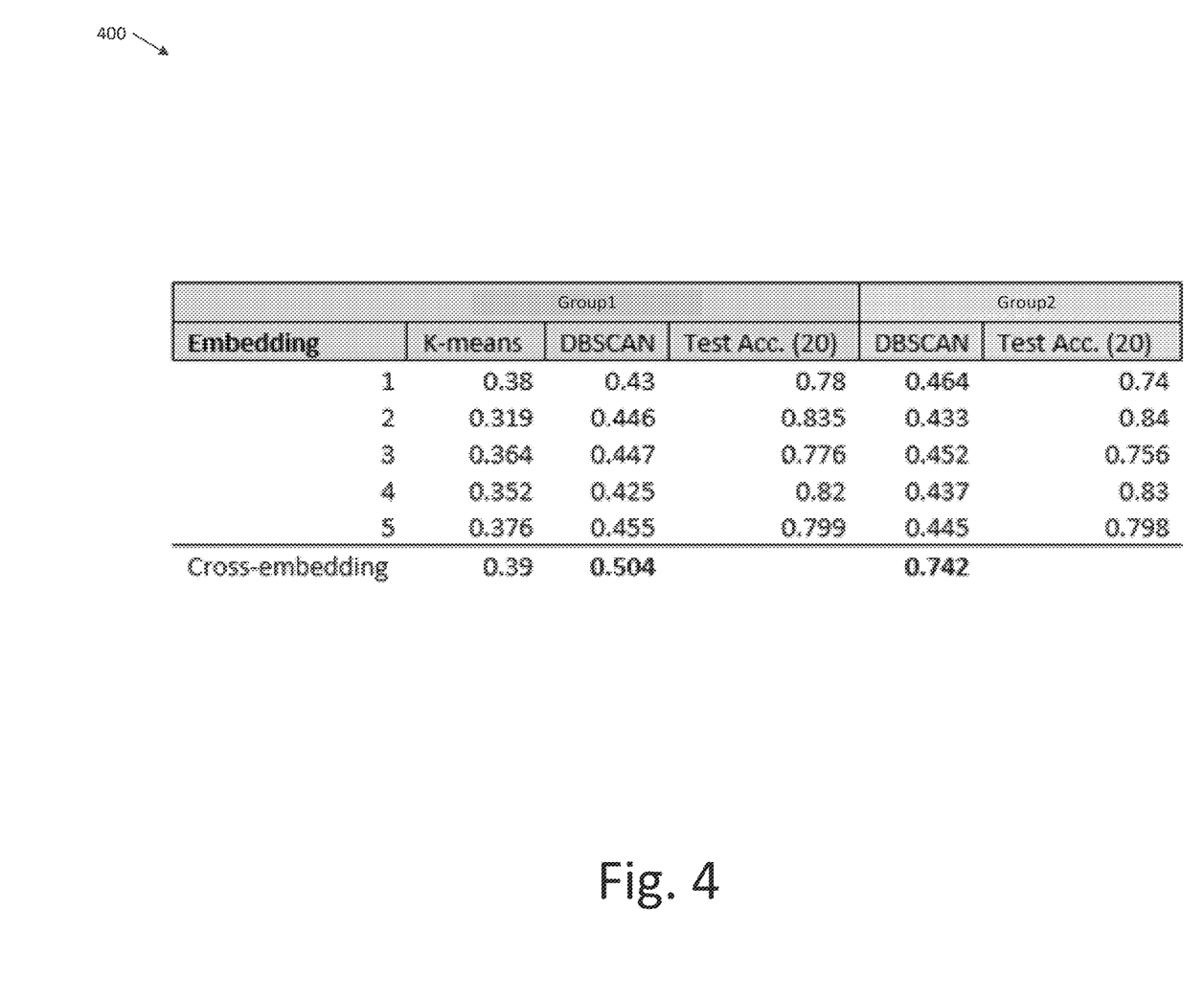
FIG. 4 is a graphical diagram showing example completeness scores for a variety of models, in accordance with some embodiments.

FIG. 4 is a graphical diagram 400 showing example completeness scores for a variety of models, in accordance with some embodiments. Two sample, non-limiting experiments are outlined below:

Experiment 1: As a proxy for selecting related models (as described herein), the CIFAR-100 training set is split into five class-disjoint sets, each with 20 classes. Five separate models/embeddings are trained using ResNet18 architecture on each of the five class-disjoint sets (Group 1). The entire CIFAR-10 testing set may then be run through Algorithm 1. Results can be found in FIG. 4.

Experiment 2: Another set of five embeddings (Group 2) may be trained, each with 20 classes as the previous group plus an additional 20 randomly selected images per class from the other 80 classes in the training set. In each of these experiments, the following clustering measures are reported:

Completeness Score: Metric that measures how many members of the same class belong to the same cluster. Ranges between [0, 1]. 1 stands for perfect labeling.

Testing Accuracy on 20 classes: Ratio of correctly labeled samples and incorrectly labeled samples for only the classes used to train the model.

In one embodiment, when combining multiple embeddings together using the approach in Algorithm 1, a statistically-significant gain in cluster accuracy (in terms of completeness over any single embedding clustering) may be achieved. These gains may reflect the fact that only a small portion of the unseen classes in the unlabeled data were sufficiently clustered. To help guide each of the models to achieve better embeddings, and therefore better clusters, Experiment 2 is designed so that each model is able to learn from a few labeled samples from each of the other classes. Note that providing this data still achieves a goal of significantly reducing the labeling effort, since each class comprises 6000 samples (i.e., less than 1% of the available data is labeled if 20 labeled samples are provided). The results from this experiment are much improved; by allowing each model to learn from 20 randomly selected samples from other classes, a ~30PP increase is achieved over any single clustering.

Figure 5:
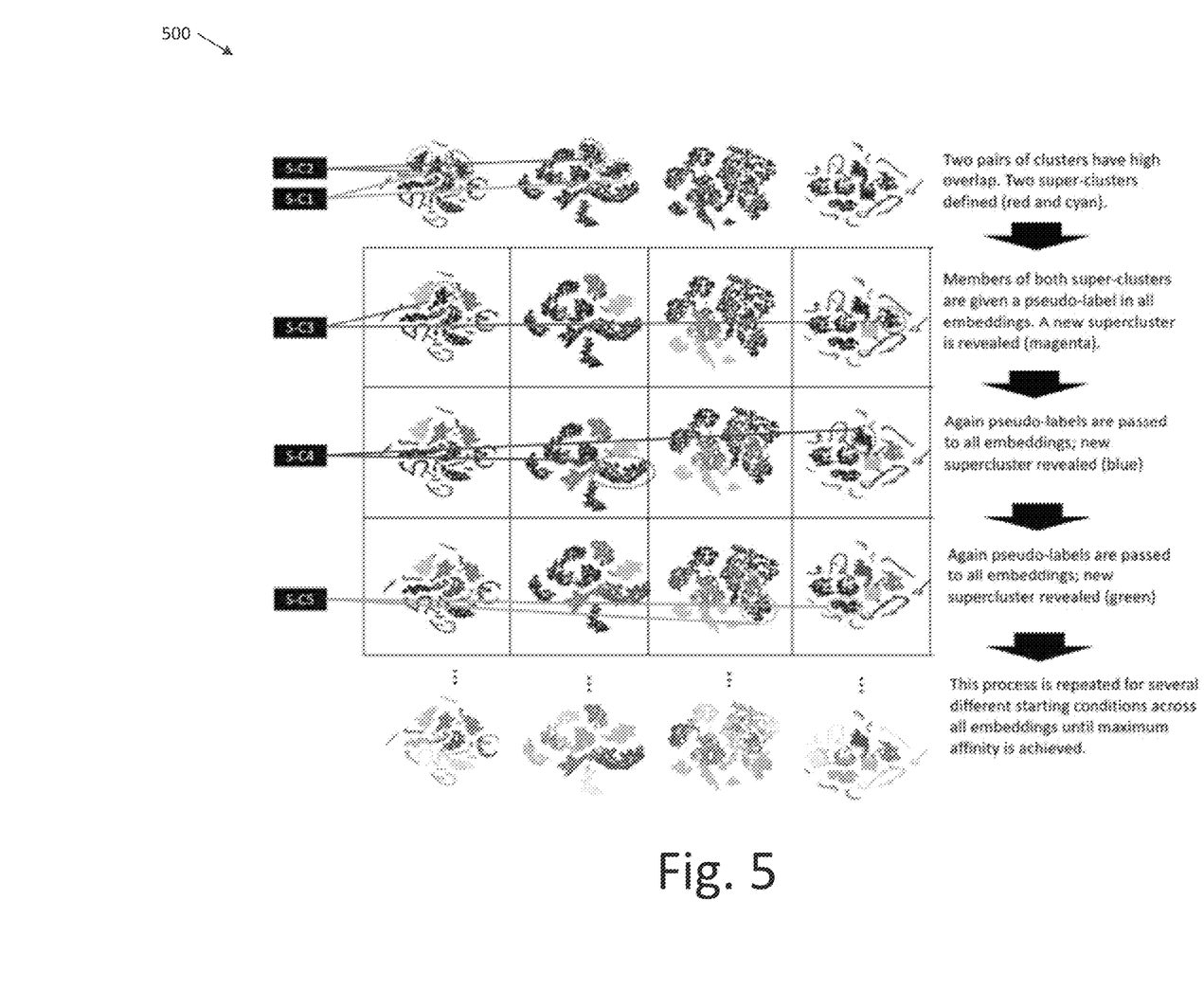
FIG. 5 is a graphical diagram showing example identification of superclusters, in accordance with some embodiments.

FIG. 5 is a graphical diagram 500 showing example identification of superclusters, in accordance with some embodiments. Here, a label propagation algorithm that can find superclusters is described. Superclusters are defined as clusters that have high member overlap across multiple embeddings. Instead of only looking at clusters in the best detected embedding/graph in Algorithm 1, superclusters are detected by examining clustering results across multiple embeddings. An example illustration of superclusters (with N=2) can be found in FIG. 5. In this example, superclusters are iteratively discovered and labeled across multiple embeddings. Note that in this illustration, it is assumed that new clusters are revealed each iteration even though it may not appear that way visually.

Referring to FIG. 5, feature embeddings were extracted for the CIFAR-10 validation set. Visualizations were created using t-Distributed Stochastic Neighbor Embedding (t-SNE). In the first row, two clusters from two different embeddings are discovered that have high sample overlap (indicated by cyan and red circles). Members of these clusters are then assigned a pseudo-label (row two) in all feature embeddings, and they are removed from consideration in future iterations. This process is then repeated until all samples have been labeled. In one embodiment, superclusters to be extracted may be those that span more model embeddings. In other embodiments, models may be assigned weights based on, for example, relevance scores from model ontologies or other scoring, and superclusters will be ranked by the weighted average of the number of model embeddings they span. In one embodiment, the number of superclusters to extract in any one round may be the "highest ranking" N superclusters, where N is 1 or more.

In a different embodiment, the graph clustering in Algorithm 2 below may be used. This algorithm can be useful when Algorithm 1 chooses compact clusters early on that reduce the quality of later clusters. As an example, the dataset could include images of various mammals and insects, and the goal may be a classifier of N animals, whether they be mammals or insects. For an embedding that does a good job of distinguishing insects from non-insects, the MaxC cluster identified in the first pass through the while loop might wind up being the cluster of all insects. In that case, subsequent passes through the while loop may only be distinguishing amongst mammals, which was not the intent. Algorithm 2 selects the Nth best cluster in terms of compactness rather than the best cluster, which in some cases can provide better separation within larger groups.

---

Algorithm 2

---

Target dataset : TD;
Selected models (embeddings) : SE;
Initialize number of classes to be discerned : N;
while N != 0 do
    for embedding in SE do
        For data in TD, compute features for embedding;
            for one or more clustering methods (e.g. K-Means, DB-SCAN) do
                Clustering;
                Calculate the Davies Bouldin score or Silhouette Score: Score;
        Select the embedding (model) and clustering with the best Score : Best_clustering;
    Calculate the compactness of each cluster in Best_clustering : Compa;
    Pick the cluster with the $N^{th}$ largest Compa : NthC;
    Assign a unique pseudo label to all the points within NthC;
    Remove the points in NthC from TD;
    Decrease N;
end while

---

In yet another embodiment, both Algorithm 1 and Algorithm 2 can be applied to the data, and the sum of the compactnesses of the N final class clusters can be compared. The class clusters from the algorithm yielding the best sum of compactnesses can then be chosen as the class clusters to deploy.

Figure 6:
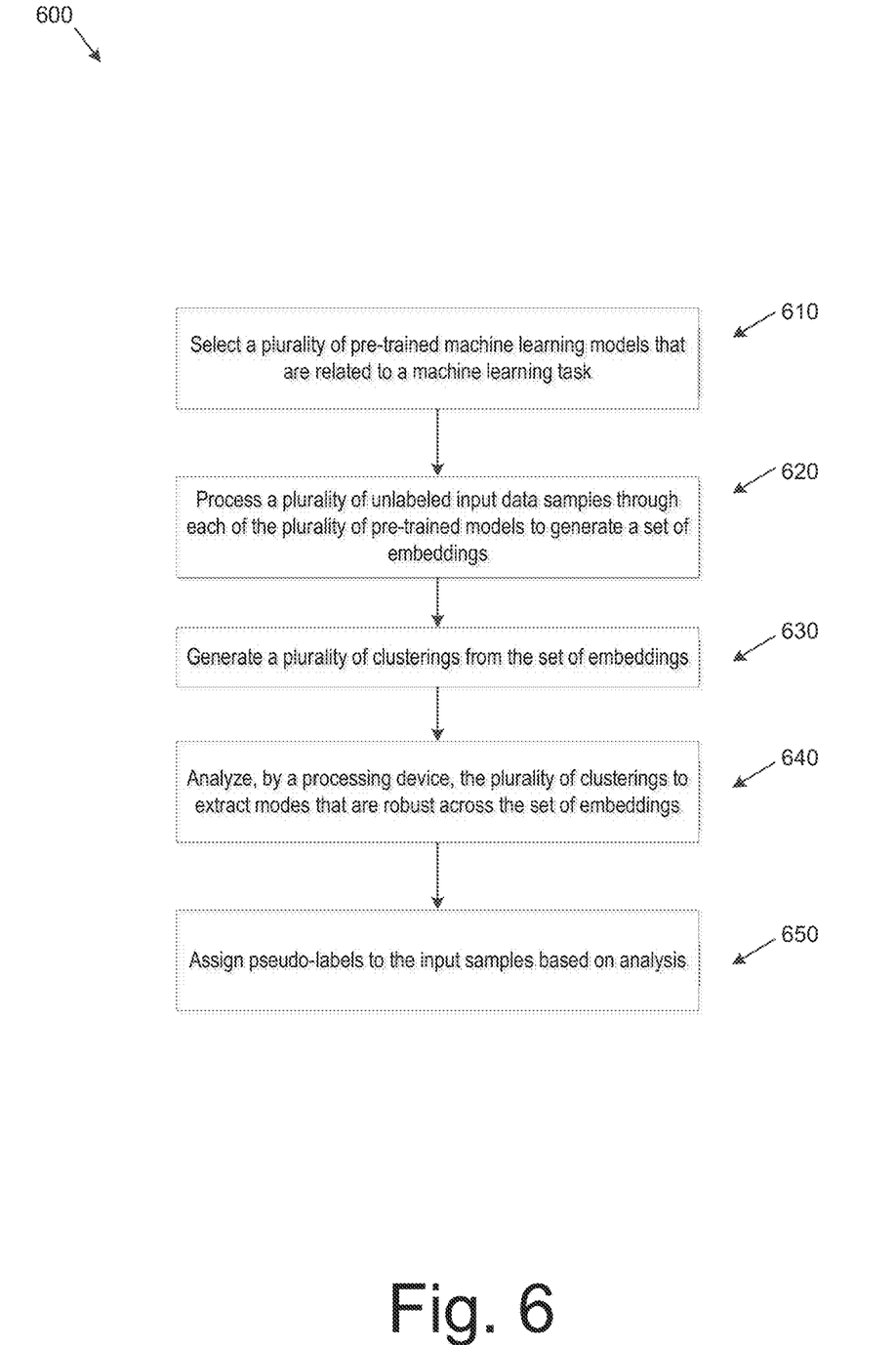
FIG. 6 is a graphical flow diagram showing a third method of using multiple trained models to reduce data labeling efforts, in accordance with some embodiments.

FIG. 6 is a graphical flow diagram showing a third method of using multiple trained models to reduce data labeling efforts, in accordance with some embodiments. For example, the processes described with reference to FIG. 6 may be performed by processing logic of machine learning architecture 127 as described with reference to FIG. 1.

At block 610, processing logic selects a plurality of pre-trained machine learning models that are related to a machine learning task. Selection of the models may be performed by any number of selection criteria and/or processes described herein or otherwise contemplated. In one embodiment, the machine learning task is an image classification task. In other embodiments, any other types of machine learning tasks are contemplated.

At block 620, processing logic processes a plurality of unlabeled input data samples through each of the plurality of pre-trained models to generate a set of embeddings. In one embodiment, the set of embeddings may be generated from various layers within the plurality of pre-trained models. At block 630, processing logic generates a plurality of clusterings from the set of embeddings. In one embodiment, the plurality of clusterings may be generated from a plurality of layer depths within the plurality of pre-trained models. In another embodiment, clustering may be performed based on hand-crafted features. For example, clustering may be performed on color histograms, local binary patterns, HoG features, etc. In one embodiment, such hand-crafted features may be the source of another embedding (e.g., in FIG. 2).

At block 640, processing logic analyzes, e.g., by a processing device, the plurality of clusterings to extract superclusters. In one embodiment, the analyzing includes determining at least one of a structure or pattern of each of the plurality of clusterings to extract the superclusters. In other embodiments, alternative or supplemental criteria may be used. At block 650, processing logic assigns pseudo-labels to the input samples based on the supercluster analysis. To extract superclusters and assign pseudo-labels, processing logic may determine that different samples from the unlabeled input data samples belong to a same unknown class.

In one embodiment, processing logic may optionally assign actual labels to the input samples. For example, in one embodiment, processing logic may receive a human-labeled sample corresponding to a first input sample and label a second input based on the human-labeled sample and a pseudo-label associated with the first input sample and the second input sample. In another embodiment, processing logic may optionally receive a human-labeled sample corresponding to a first input sample and analyze the plurality of clusterings to extract the superclusters based on the human-labeled sample.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 7:
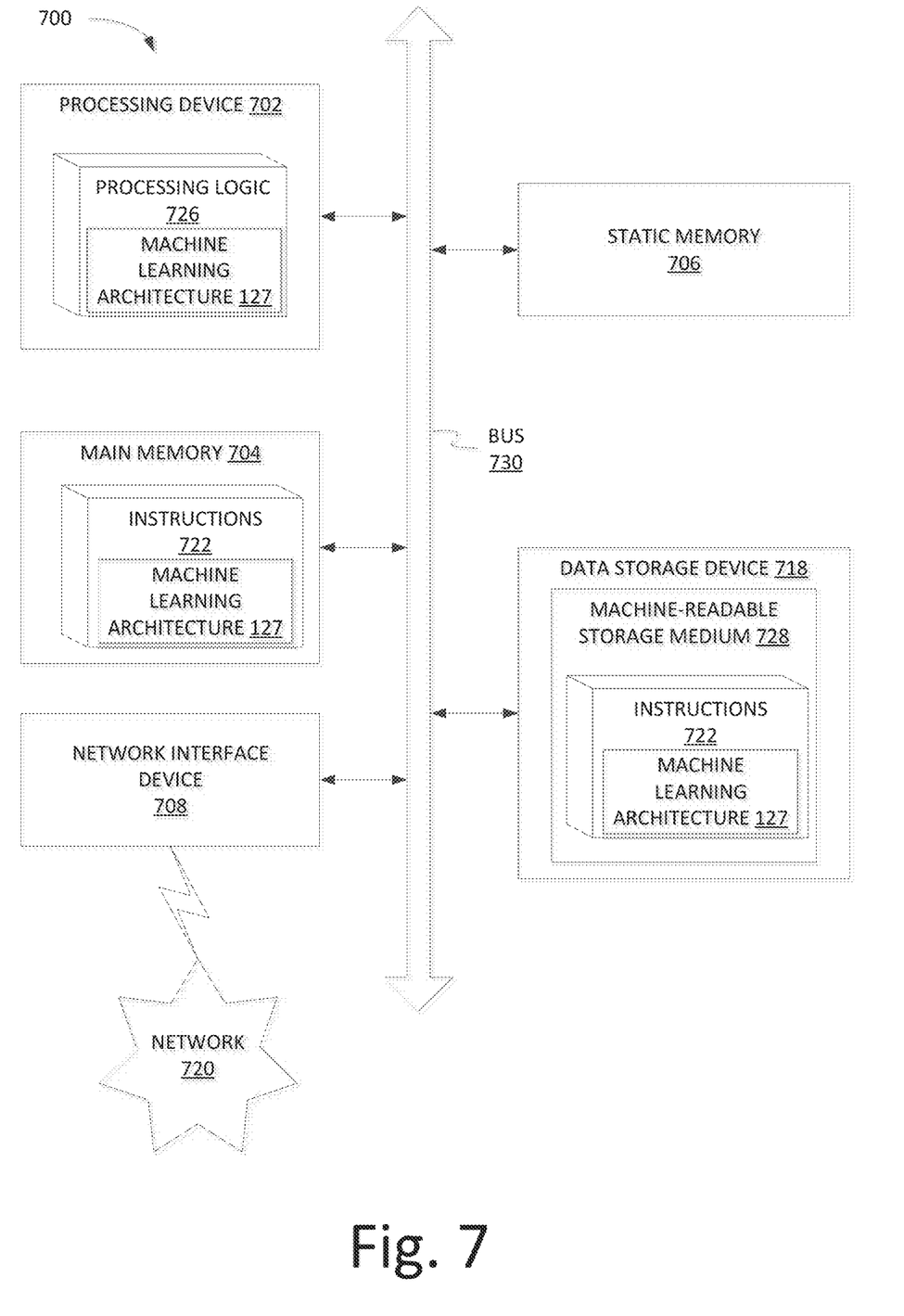
FIG. 7 is an illustration showing an example computing device which may implement the embodiments described herein.

FIG. 7 illustrates a diagrammatic representation of a machine in the example form of a computer system 700 within which a set of instructions 722, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server computer system, such as system 100.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of system 100 shown in FIG. 1, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute system 100. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform the methods and operations described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
    inputting a testing set comprising a plurality of input data samples into each one of a plurality of pre-trained machine learning models to generate a set of embeddings output by the plurality of pre-trained machine learning models; and
    performing, by a processing device, N iterations of a cluster labeling algorithm, wherein each iteration comprises:
        generating a plurality of clusterings from the set of embeddings;
        analyzing the plurality of clusterings to identify a target embedding with a highest cluster quality among the set of embeddings;
        analyzing the target embedding to determine a compactness for each of the plurality of clusterings of the target embedding;
        identifying a target cluster among the plurality of clusterings of the target embedding based on the compactness, wherein a subset of the plurality of input data samples are members of the target cluster; and
        assigning pseudo-labels to the subset of the plurality of input data samples and removing the subset from the testing set for all embeddings.

2. The method of claim 1, wherein identifying the target cluster based on the compactness comprises identifying the target cluster based on the target cluster having a largest compactness among the plurality of clusterings of the target embedding.

3. The method of claim 1, wherein identifying the target cluster based on the compactness comprises identifying the target cluster based on the target cluster having a lowest compactness among the plurality of clusterings of the target embedding.

4. The method of claim 3, wherein the N iterations of the cluster labeling algorithm result in a first set of N class clusters, the method further comprising:
    performing an additional N iterations of the cluster labeling algorithm over the set of embeddings to generate a second set of N class clusters, wherein, at each iteration, identifying the target cluster based on the compactness comprises identifying the target cluster based on the target cluster having a largest compactness among the plurality of clusterings of the target embedding; and
    deploying the first set of N class clusters or the second set of N class clusters based on which set exhibits better total compactness.

5. The method of claim 1, wherein the set of embeddings output by the plurality of pre-trained machine learning models are generated from a plurality of layer depths within the plurality of pre-trained machine learning models.

6. The method of claim 1, wherein each of the plurality of pre-trained machine learning models is configured to perform a machine learning task comprising at least one of: an image classification task, a video classification task, or an audio classification task.

7. The method of claim 1, further comprising:
receiving a human label corresponding to a first input data sample of the plurality of input data samples; and
assigning the human label to a second input data sample of the plurality of input data samples based on the second input data sample having a same pseudo-label as the first input data sample.

8. A system comprising:
a memory to store:
a testing set comprising a plurality of input data samples; and
a plurality of pre-trained machine learning models that are related to a machine learning task; and
a processing device, operatively coupled to the memory, to:
input the testing set comprising the plurality of input data samples into each of the plurality of pre-trained machine learning models to generate a set of embeddings output by the plurality of pre-trained machine learning models; and
perform N iterations of a cluster labeling algorithm, wherein at each iteration the processing device is to:
generate a plurality of clusterings from the set of embeddings;
analyze the plurality of clusterings to identify a target embedding with a highest cluster quality among the set of embeddings;
analyze the target embedding to determine a compactness for each of the plurality of clusterings of the target embedding;
identify a target cluster among the plurality of clusterings of the target embedding based on the compactness, wherein a subset of the plurality of input data samples are members of the target cluster; and
assign pseudo-labels to the subset of the plurality of input data samples and remove the subset from the testing set for all embeddings.

9. The system of claim 8, wherein to identify the target cluster based on the compactness, the processing device is to identify the target cluster based on the target cluster having a largest compactness among the plurality of clusterings of the target embedding.

10. The system of claim 8, wherein to identify the target cluster based on the compactness, the processing device is to identify the target cluster based on the target cluster having a lowest compactness among the plurality of clusterings of the target embedding.

11. The system of claim 10, wherein the N iterations of the cluster labeling algorithm result in a first set of N class clusters, and wherein the processing device is further to:
perform an additional N iterations of the cluster labeling algorithm over the set of embeddings to generate a second set of N class clusters, wherein, at each iteration, the processing device is to identify the target cluster based on the target cluster having a largest compactness among the plurality of clusterings of the target embedding; and
deploy the first set of N class clusters or the second set of N class clusters based on which set exhibits better total compactness.

12. The system of claim 8, wherein the set of embeddings output by the plurality of pre-trained machine learning models are generated from a plurality of layer depths within the plurality of pre-trained machine learning models.

13. The system of claim 8, wherein each of the plurality of pre-trained machine learning models is configured to perform a machine learning task comprising at least one of: an image classification task, a video classification task, or an audio classification task.

14. The system of claim 8, wherein the processing device is further to:
receive a human label corresponding to a first input data sample of the plurality of input data samples; and
assign the human label to a second input data sample of the plurality of input data samples based on the second input data sample having a same pseudo-label as the first input data sample.

15. A non-transitory computer-readable storage medium having instructions stored thereon that, when executed by a processing device, cause the processing device to:
input a testing set comprising a plurality of input data samples into each one of a plurality of pre-trained machine learning models to generate a set of embeddings output by the plurality of pre-trained machine learning models; and
perform N iterations of a cluster labeling algorithm, wherein at each iteration the processing device is to:
generate a plurality of clusterings from the set of embeddings;
analyze the plurality of clusterings to identify a target embedding with a highest cluster quality among the set of embeddings;
analyze the target embedding to determine a compactness for each of the plurality of clusterings of the target embedding;
identify a target cluster among the plurality of clusterings of the target embedding based on the compactness, wherein a subset of the plurality of input data samples are members of the target cluster; and
assign pseudo-labels to the subset of the plurality of input data samples and remove the subset from the testing set for all embeddings.

16. The non-transitory computer-readable storage medium of claim 15, wherein to identify the target cluster based on the compactness, the instructions cause the processing device to identify the target cluster based on the target cluster having a largest compactness among the plurality of clusterings of the target embedding.

17. The non-transitory computer-readable storage medium of claim 15, wherein to identify the target cluster based on the compactness, the instructions cause the processing device to identify the target cluster based on the target cluster having a lowest compactness among the plurality of clusterings of the target embedding.

18. The non-transitory computer-readable storage medium of claim 17, wherein the N iterations of the cluster labeling algorithm result in a first set of N class clusters, and wherein the instructions further cause the processing device to:
perform an additional N iterations of the cluster labeling algorithm over the set of embeddings to generate a second set of N class clusters, wherein, at each iteration, the processing device is to identify the target cluster based on the target cluster having a largest compactness among the plurality of clusterings of the target embedding; and deploy the first set of N class clusters or the second set of N class clusters based on which set exhibits better total compactness.

19. The non-transitory computer-readable storage medium of claim 15, wherein the set of embeddings output by the plurality of pre-trained machine learning models are generated from a plurality of layer depths within the plurality of pre-trained machine learning models.

20. The non-transitory computer-readable storage medium of claim 15, wherein each of the plurality of pre-trained machine learning models is configured to perform a machine learning task comprising at least one of: an image classification task, a video classification task, or an audio classification task.

* * * * *